(12) United States Patent
Howard et al.

(10) Patent No.: US 11,436,411 B2
(45) Date of Patent: Sep. 6, 2022

(54) DETECTING CONTINUING CONVERSATIONS WITH COMPUTING DEVICES

(71) Applicant: Google LLC, Mountain View, CA (US)

(72) Inventors: Nathan David Howard, Mountain View, CA (US); Gabor Simko, Santa Clara, CA (US); Andrei Giurgiu, Zurich (CH); Behshad Behzadi, Oechsli (CH); Marcin M. Nowak-Przygodzki, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 277 days.

(21) Appl. No.: 16/698,350

(22) Filed: Nov. 27, 2019

(65) Prior Publication Data

US 2020/0272690 A1  Aug. 27, 2020

Related U.S. Application Data

(63) Continuation of application No. PCT/US2019/019829, filed on Feb. 27, 2019.

(51) Int. Cl.
*G06F 40/284* (2020.01)
*G06F 16/903* (2019.01)
(Continued)

(52) U.S. Cl.
CPC ........ *G06F 40/284* (2020.01); *G06F 16/9024* (2019.01); *G06F 16/90335* (2019.01);
(Continued)

(58) Field of Classification Search
CPC ... G10L 15/08; G10L 15/22; G10L 2015/088; G10L 2015/223; G10L 25/51
See application file for complete search history.

(56) References Cited

U.S. PATENT DOCUMENTS 10,847,149 B1 * 11/2020 Mok ................. G10L 15/22
2007/0143322 A1 * 6/2007 Kothari ............. G06F 40/194
(Continued)

FOREIGN PATENT DOCUMENTS

EP  2950307  12/2015
EP  3146523  3/2017
(Continued)

OTHER PUBLICATIONS

European Patent Office; International Search Report and Written Opinion of Ser. No. PCT/US2019/019829; 14 pages dated Nov. 19, 2019.
(Continued)

*Primary Examiner* — Samuel G Neway
(74) *Attorney, Agent, or Firm* — Middleton Reutlinger

(57) ABSTRACT

Methods, systems, and apparatus, including computer programs encoded on a computer storage medium, for detecting a continued conversation are disclosed. In one aspect, a method includes the actions of receiving first audio data of a first utterance. The actions further include obtaining a first transcription of the first utterance. The actions further include receiving second audio data of a second utterance. The actions further include obtaining a second transcription of the second utterance. The actions further include determining whether the second utterance includes a query directed to a query processing system based on analysis of the second transcription and the first transcription or a response to the first query. The actions further include configuring the data routing component to provide the second transcription of the second utterance to the query processing system as a second query or bypass routing the second transcription.

19 Claims, 4 Drawing Sheets

(51) Int. Cl.
*G06F 16/901* (2019.01)
*G06N 5/02* (2006.01)
*G10L 15/22* (2006.01)
*G10L 25/51* (2013.01)
*G10L 15/08* (2006.01)

(52) U.S. Cl.
CPC .............. *G06N 5/02* (2013.01); *G10L 15/08* (2013.01); *G10L 15/22* (2013.01); *G10L 25/51* (2013.01)

(56) References Cited

U.S. PATENT DOCUMENTS

| | | | | |
|---|---|---|---|---|
| 2012/0197631 | A1* | 8/2012 | Ramani | G06F 40/268 704/9 |
| 2013/0144616 | A1 | 6/2013 | Bangalore | |
| 2015/0348548 | A1* | 12/2015 | Piernot | H04W 4/025 704/235 |
| 2018/0137090 | A1* | 5/2018 | Duan | G06F 40/30 |
| 2018/0285068 | A1* | 10/2018 | Lu | G08C 23/02 |
| 2018/0285326 | A1* | 10/2018 | Goyal | G06F 40/197 |
| 2019/0279624 | A1* | 9/2019 | Boss | G06F 40/20 |
| 2020/0051554 | A1* | 2/2020 | Kim | G06F 3/167 |
| 2020/0194007 | A1* | 6/2020 | Fan | G10L 17/26 |

FOREIGN PATENT DOCUMENTS

| | | |
|---|---|---|
| JP | 2000276487 | 10/2000 |
| JP | 2016004270 | 1/2016 |
| JP | 2018113064 | 7/2018 |
| WO | 2014015267 | 1/2014 |
| WO | 2019022797 | 1/2019 |

OTHER PUBLICATIONS

Japanese Patent Office; Office Action issued in Application No. 2020-569894; 17 pages; dated Jan. 17, 2022.
Intellectual Property India; Examination Report issued in Application No. 202027054381; 6 pages; dated Dec. 22, 2021.
Australian Patent Office; Examination Report issued in Application No. 2019431467; 3 pages; dated Nov. 17, 2021.
European Patent Office; Communication Pursuant to Article 94(3) EPC issued in Application No. 19710269.2; 6 pages; dated Nov. 12, 2021.
Australian Patent Office; Notice of Acceptance issued in Application No. 2019431467, 3 pages, dated Feb. 2, 2022.
The Korean Intellectual Property Office; Notice of Office Action issued in Application No. 10-2020-7036729; 10 pages; dated Feb. 15, 2022.

* cited by examiner

US 11,436,411 B2

DETECTING CONTINUING CONVERSATIONS WITH COMPUTING DEVICES

CROSS-REFERENCE TO RELATED APPLICATION

This application is a continuation of International Application No. PCT/US2019/019829, filed Feb. 27, 2019, which is incorporated by reference.

TECHNICAL FIELD

This specification generally relates to natural language processing.

BACKGROUND

Natural language processing is related to the interactions between computers and human languages, in particular how to program computers to process and analyze natural language data. Natural language processing may involve speech recognition, which is a field of computational linguistics that enables the recognition and translation of spoken language into text by computers.

SUMMARY

When a user wishes to interact with a device, the user may press buttons on the device, touch the screen of the device, or speak to the device. By pressing buttons on the device or touching the screen of the device, it is clear that the user is interacting with the device. When a user interacts by speaking to the device, however, it may not be as clear whether speech is intended as an input to the device. Because of this ambiguity, some devices are configured to detect when a user speaks a hotword. The hotword acts as a signal from the user to the device that the user is directing the speech that follows the hotword to the device. For example, if a user only says, "how old is Barack Obama," the microphone of the device may detect the user's speech, but may not perform an action because the utterance was not preceded by a hotword. If instead, the user says, "ok computer, how old is Barack Obama," the device detects the hotword "ok computer" and determines that "how old is Barack Obama" is intended as an input for the device, so the device responds and performs the appropriate action.

In instances where the user follows up with an additional spoken request to the device, it may be awkward for the user to continue to say the hotword before each statement intended for the device. For example, a user may initially say, "ok computer, how old is Barack Obama," and then follow up with "ok computer, how tall is Barack Obama" and "ok computer, where was he born." It would be more natural if the user were able to continue interacting with the device without having to say the hotword "ok computer" each time. However, without a hotword preceding each request, many devices will not detect the utterance as an input because the devices can not determine that the user was speaking to the device.

To remedy this problem, the device may be configured to determine whether a follow-up utterance (e.g., a second or subsequent request from a user in a conversation with a device) is intended for the device even if the user does not include a hotword in the follow-up utterance. Following the example from above, the user may initially say, "ok computer, how old is Barack Obama," and then after a response from the device follow up with "how tall is Barack Obama" and further "where was he born." The device may analyze the content of the follow-up utterances in additional to other signals to determine whether the follow-up utterance was intended for the device or whether the user may be speaking to another person.

For example, a device may compare the terms of the follow-up utterance to the terms of the initial utterance. If the terms match or are sufficiently related, then the device may determine that the user intended the follow-up utterance for the device. The device may take into account the content of the screen of the device, the location of the device, the current time, and/or the user's previous utterances intended for the device to determine whether the user intended the follow-up utterance for the device. If the device determines that the follow-up utterance was intended for the device, then the device will perform the action according to the transcription of the utterance. If the device determines that the follow-up utterance was not intended for the device, then the device will take no action.

According to an innovative aspect of the subject matter described in this application, a method for detecting a continued conversation includes the actions of receiving, by a computing device, first audio data of a first utterance; obtaining, by the computing device, a first transcription of the first utterance; receiving, by the computing device, second audio data of a second utterance; obtaining, by the computing device, a second transcription of the second utterance; determining, by the computing device, whether the second utterance includes a query directed to a query processing system based on analysis of (i) the second transcription and (ii) the first transcription or a response to the first query; and, based on determining whether the second utterance includes a query directed to the query processing system, configuring, by the computing device, the data routing component to (i) provide the second transcription of the second utterance to the query processing system as a second query or (ii) bypass routing the second transcription so that the second transcription is not provided to the query processing system.

These and other implementations can each optionally include one or more of the following features. The action of determining whether the second utterance includes a query directed to a query processing system is based on analysis of (i) the second transcription and (ii) the first transcription. The action of determining whether the second utterance includes a query directed to a query processing system is based on analysis of (i) the second transcription and (ii) the response to the first query. The action of determining whether the second utterance includes a query directed to a query processing system is based on analysis of the second transcription, the first transcription, and the response to the first query. The action of determining whether the second utterance includes a query directed to the query processing system includes determining that the second utterance includes a query directed to the query processing system. The actions of further include configuring the data routing component to provide the second transcription of the second utterance to the query processing system as a second query.

The action of determining whether the second utterance includes a query directed to the query processing system includes determining that the second utterance does not include a query directed to the query processing system. The actions further include configuring the data routing component to bypass routing the second transcription so that the second transcription is not provided to the query processing system. The action of determining whether the second utterance includes a query directed to a query processing system includes tokenizing (i) the second transcription and (ii) the first transcription or the response to the first query; and comparing (i) terms of the second transcription and (ii) terms of the first transcription or the response to the first query. The action of comparing (i) the terms of the second transcription and (ii) the terms of the first transcription or the response to the first query includes determining a relationship between (i) the terms of the second transcription and (ii) the terms of the first transcription or the response to the first query in a knowledge graph. The action of determining whether the second utterance includes a query directed to a query processing system is based on comparing (i) a grammatical structure of the second transcription and (ii) a grammatical structure of the first transcription or the response to the first query.

The action of determining whether the second utterance includes a query directed to the query processing system is based on comparing (i) the grammatical structure of the second transcription and (ii) the grammatical structure of the first transcription or the response to the first query. The action of determining whether the second utterance includes a query directed to a query processing system includes tokenizing the second transcription; and determining that terms of the second transcription include a pronoun. The action of determining that the second utterance includes a query directed to the query processing system is based on determining that the terms of the second transcription include a pronoun. The actions further include determining content on a user interface; and determining whether the second utterance includes a query directed to the query processing system based on the content of the user interface. The actions further include determining a location of a user device that detected the first utterance and the second utterance through a microphone; and determining whether the second utterance includes a query directed to the query processing system based on the location of the user device that detected the first utterance and the second utterance through the microphone.

The actions further include determining a time that the computing device receives the second audio data of the second utterance; and determining whether the second utterance includes a query directed to the query processing system based on the time that the computing device receives the second audio data of the second utterance. The action of analyzing (i) the second transcription and (ii) the first transcription or the response to the first query includes comparing the second transcription with one or more queries in a query log. The action of determining whether the second utterance includes a query directed to the query processing system is based on comparing the second transcription with the one or more queries in the query log. The actions further include providing, by the data routing component of the computing device, the first transcription of the first utterance as a first query to the query processing system; receiving, from the query processing system, the response to the first query; and providing, for output by the computing device, the response to the first query.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. A computing device may be able to determine when a user is continuing a conversation with the computing device even if the user does not include a hotword. Implementations provide a predictive voice-based user input mechanism that allows voice commands to be correctly processed and an improved user interface is thereby provided. By removing the need for a user to provide a hotword each time a command is provided, the number of user inputs required to perform a task are reduced and the user input is simplified. Implementations may address problems of how to provide an improved voice-based user input mechanism, and in particular that ensures that an operation is executed in response to a simplified voice command.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
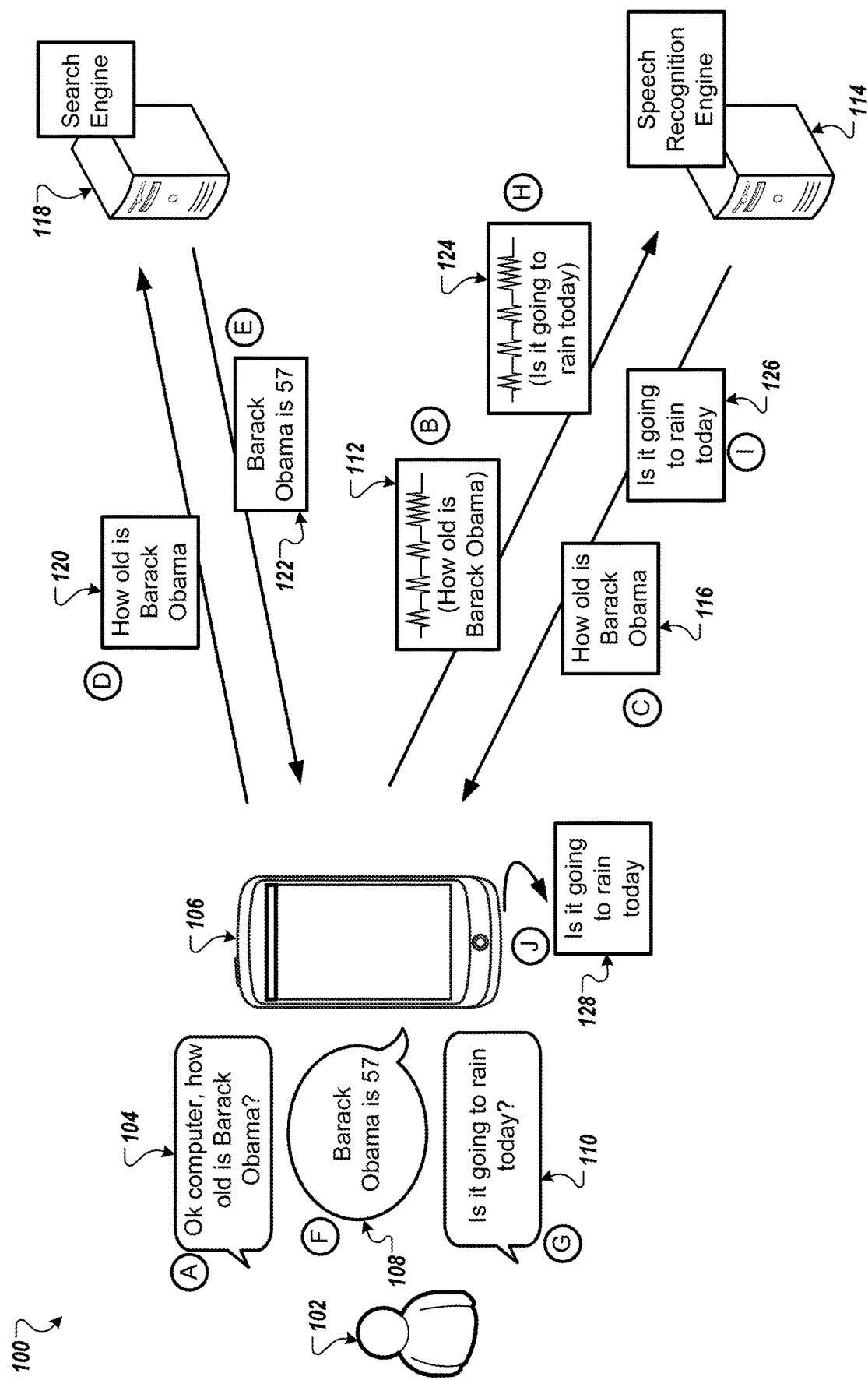
FIG. 1 illustrates an example system that determines whether a user is addressing a computing device.

FIG. 1 illustrates an example system 100 that determines whether a user is addressing a computing device. Briefly, and as described in more detail below, the user 102 speaks an utterance 104 in the vicinity of computing device 106. The computing device 106 detects the utterance 104 and provides a response 108. The user then speaks a second utterance 110 in the vicinity of the computing device 106. Based on a combination of the utterance 104, the response 108, and the utterance 110, as well as potentially other factors, the computing device 106 determines whether the user 102 was addressing the computing device 106 when the user 102 spoke the utterance 110.

In more detail and in stage A, the user 102 speaks the utterance 104 by saying, for example, "Ok computer, how old is Barack Obama?" The microphone of the computing device 106 detects the utterance 104 and processes the audio data of the utterance 104. The computing device 106 determines that the utterance 104 includes the hotword "ok computer." The user 102 may precede any utterance intended for the computing device 106 with a hotword to indicate to the computing device 106 that the user 102 is addressing the computing device 106. For example, the user may say, "ok computer, call mom." The computing device 106 will receive the utterance, and based on detecting the hotword "ok computer," the computing device 106 will perform an action based on the utterance "call mom."

There may be other ways for the user 102 to indicate to the computing device 106 that the user 102 is addressing the computing device 106. For example, the user 102 may press a button on the computing device 106 or tap the screen of the computing device 106 before speaking the utterance. The user 102 may pick up the computing device 106 and hold the computing device 106 at a particular angle, such as upright, before speaking the utterance. The user 102 may press a button on an accessory connected to the computing device 106. For example, the user may press a button on wired or wireless headphones connected to the computing device 106. In response to any of these actions by the user, the computing device 106 processes the subsequently received utterance and performs the corresponding action.

In the example illustrated in FIG. 1, the computing device 106 begins processing the audio data of the utterance 104 that follows the hotword "ok computer" in response to detecting the hotword. In stage B, the computing device provides the audio data 112 that follows the hotword to a speech recognition engine 114. The speech recognition engine 114 may be included in the computing device 106 or may be a separate device. The speech recognition engine 114 performs automated speech recognition on the audio data 112 and provides the transcription 116 of "how old is Barack Obama" to the computing device 106 in stage C.

The computing device 106 analyzes the transcription 116 and determines an appropriate action to perform. In the example shown in FIG. 1, the computing device 106 determines that the transcription 116, "How old is Barack Obama" is a search query. The computing device 106 configures a data routing component of the computing device 106 to route the transcription 116 to the search engine 118 as the search query 120.

The computing device 106 may configure the data routing component of the computing device 106 to route the transcription 116 to another internal or external component depending on the text of the transcription 116. For example, the computing device 106 may receive an utterance of "ok computer, text mom I'll be home soon." The computing device may receive the transcription "text mom I'll be home soon" from the speech recognition engine and configure the data routing component to route "I'll be home soon" to a messaging application and route "mom" to a contacts application.

In stage D, the search engine 118 receives the search query 120. The search engine 118 processes the search query and returns the search result 122 indicating that Barack Obama is 57. In stage E, the search engine 118 provides the search result 122 to the computing device 106.

In stage F, the computing device 106 presents the search result 122 to the user 102. For example, the computing device 106 may provide the search result 122 to a speech synthesizer and output an audio response 108 indicating that Barack Obama is 57. In some implementations, the computing device 106 may provide the search result 122 to the display of the computing device 106. For example, the display of the computing device 106 may display text indicating that Barack Obama is 57 years old.

Soon after the computing device 106 presents the search result 122 to the user 102 and in stage G, the user speaks another utterance 110 of "Is it going to rain today?" The user 102 may speak the utterance 110 while the computing device 106 is displaying the text of the search result 112, within a threshold period of time after the computing device outputs the audio response 108, before the computing device 102 enters a low power or sleep state after outputting the search result 112, without ending the current user session, or any other similar period of time.

The microphone of the computing device 106 detects the utterance 110 and the computing device 106 processes the audio data of the utterance 110. In this instance, user 102 does not provide any explicit indication to the computing device 106 that the user 102 is addressing the computing device. For example, the utterance 110 does not include and is not immediately preceded by a hotword. Similarly, the user 102 does not press a button on the computing device 106 or interact with the screen of the computing device 106. Even though the user 102 does not provide a clear indication that the user 102 is addressing the computing device 106, the user 102 may still be addressing the computing device 106 in an attempt to continue the conversation initiated with the utterance 104. Therefore, the computing device 106 analyzes the context of the utterance 110 to determine whether the user is likely addressing the computing device 106.

The computing device 106 provides the audio data 124 of the utterance 110 to a hotword detector and determines that the audio data of the utterance 110 does not include a hotword. In stage H, the computing device 106 provides the audio data 124 of the utterance 110 to the speech recognition engine 114. The speech recognition engine 114 performs automated speech recognition on the audio data 124 of the utterance 110. The speech recognition engine 114 provides the transcription 126 of "is it going to rain today" to the computing device 106 in stage I.

In stage J, the computing device 106 analyzes the transcription 128 of the utterance 110 and the context of the computing device 106 to determine whether the user 102 was likely addressing the computing device 106 when speaking the utterance 110. In this example, the context may include the transcription of the previous utterance 104 and the response 108 to the previous utterance 104. The computing device 106 may determine that the subject matter of the previous utterance 104 and/or the subject matter of the response 108 to the previous utterance 104 is not the same as the subject matter of the transcription 128 of the utterance 110. In this case, the computing device 106 determines that the user 102 was likely not addressing the computing device 106 when speaking the utterance 110. The computing device 106 configures the data routing component to not provide the transcription 128 to the search engine 118, any other application running on the computing device 106, any other component of the computing device 106, or any other computing device. In other words, the computing device 106 takes no further action in processing the utterance 110.

The analysis can evaluate whether the utterance 110 was intended for the device 106 based on the presence of matching terms in the utterance 110 and the previous utterance 104 and/or the response 108. In another example, the transcription 126 of the utterance 110 may be "who is Barack Obama's wife?" As part of determining the context of the computing device 106, the computing device 106 may tokenize the transcription 116 of the utterance 104, the search result 122, and the transcription 126 of the utterance 110. The computing device 106 may identify a common term among the terms of the transcription 126 and the terms of the transcription 116 and/or the search result 122. In this instance, the common term may be "Barack Obama." Based on this common term, the computing device 106 may determine that the user 102 was likely addressing the computing device 106 when speaking "who is Barack Obama's wife?"

The analysis can evaluate whether the utterance 110 was intended for the device 106 based on the presence of a pronoun in the utterance 110 and a relationship between the pronoun and terms in the previous utterance 104 and/or the response 108. In another example, the transcription 126 of the utterance 110 may be "where was he born?" As described above, the computing device 106 may tokenize the transcription 116 of the utterance 104, the search result 122, and the transcription 126 of the utterance 110. In some implementations, the computing device 106 may only tokenize the transcription 126 of the utterance 110. The computing device 106 may determine that one of the terms in the transcription 126 of the utterance 110 is the pronoun "he." The computing device 106 may determine that the user 102 was likely addressing the computing device 106 when speaking the utterance 110 based on the presence of a pronoun. In some instances, the computing device 106 may compare the pronoun of the transcription 126 to the nouns in the search result 122 and/or the transcription 116. The computing device 106 may determine that the user 102 was likely addressing the computing device 106 if the pronoun in the transcription 126 matches the gender of a noun in the search result 122 and/or the transcription 116. The computing device 106 may determine that the user 102 was likely addressing the computing device 106 if the pronoun in the transcription 126 matches the singular or plural nature of a noun in the search result 122 and/or the transcription 116. If the gender and/or the singular or plural nature of the pronoun in the transcription 126 does not match a noun in the search result 122 and/or the transcription 116, then the computing device may determine that the user 102 was not likely addressing the computing device 106

The analysis can evaluate whether the utterance 110 was intended for the device 106 based on whether the utterance 110 refers to topics or concepts referred to in the utterance 104 and/or the response 108. In another example, the transcription 126 of the utterance 110 may be "how old is Michelle Obama?" As described above, the computing device 106 may tokenize the transcription 116 of the utterance 104, the search result 122, and the transcription 126 of the utterance 110. In this instance, the computing device 106 may not identify any common terms among the terms of the transcription 126 and the terms of the transcription 116 and/or the search result 122. The computing device 106 may be able to determine that the term "Michelle Obama" in transcription 126 may be related to the term "Barack Obama" in transcription 116 and search result 122. Based on the transcription 126 including a term that is related to a term in transcription 116 and/or search result 122, the computing device 106 may determine that the user 102 was likely addressing the computing device 106 when speaking "how old is Michelle Obama?"

The analysis can evaluate whether the utterance 110 was intended for the device 106 based on whether a sentence structure or phrasing of the utterance 110 sufficiently matches the structure of another known communication intended for a device. For example, the device 106 can assess whether the utterance 110 uses a pattern or similar to the utterance 104, to utterances by the same user during a previous conversation with the device, or to utterances of other users to devices. In another example, the transcription 126 of the utterance 110 may be "how old is Bill Gates?" As described above, the computing device 106 may tokenize the transcription 116 of the utterance 104, the search result 122, and the transcription 126 of the utterance 110. In this instance, the computing device 106 may not identify any common terms among the terms of the transcription 126 and the terms of the transcription 116 and/or the search result 122. The computing device 106 may also provide (i) the transcription 126 and (ii) the transcription 116 and/or the search result 122 to a grammatical analyzer. The grammatical analyzer may be able to determine whether the sentence structure of (i) the transcription 126 and (ii) the transcription 116 and/or the search result 122 is similar enough to indicate that the user 102 was addressing the computing device 106 when speaking the utterance 110. In this instance, the structure of "how old is <person>" is the same in both transcription 116 and transcription 126. Therefore, the computing device 106 may determine that the user 102 was likely addressing the computing device 106 when speaking "how old is Bill Gates?" due to the presence of the pattern that is known, from one or more prior interactions, to have a high likelihood of representing an input to a device.

The analysis can evaluate whether the utterance 110 was intended for the device 106 based on additional factors discussed below, such as the content displayed on the screen of the device 106, the location of the device 106, the time that the query is received, previous queries and patterns of query submission by the user, and whether the utterance 110 requests the same type of information as the utterance 104. The device may increase the likelihood that the user is addressing the device if a response to the utterance 110 generated by the device continues the topic of the utterance 104 and/or the response 108. The device may increase the likelihood that the user is addressing the device if the device is able to identify a response to the utterance 108 other than performing a general internet search. The device may increase the likelihood that the user is addressing the device if the device is confident that response to the utterance 108 is an appropriate response. An indication of this may include the response 108 and a response to the utterance 110 having consistent answer types. The analysis can also consider factors that would indicate that the utterance 110 is not intended for the device, such as the utterance beginning with a name of a person ("John, should we . . . ") or using a first person plural form (e.g., "we," "let's," etc.).

Figure 2:
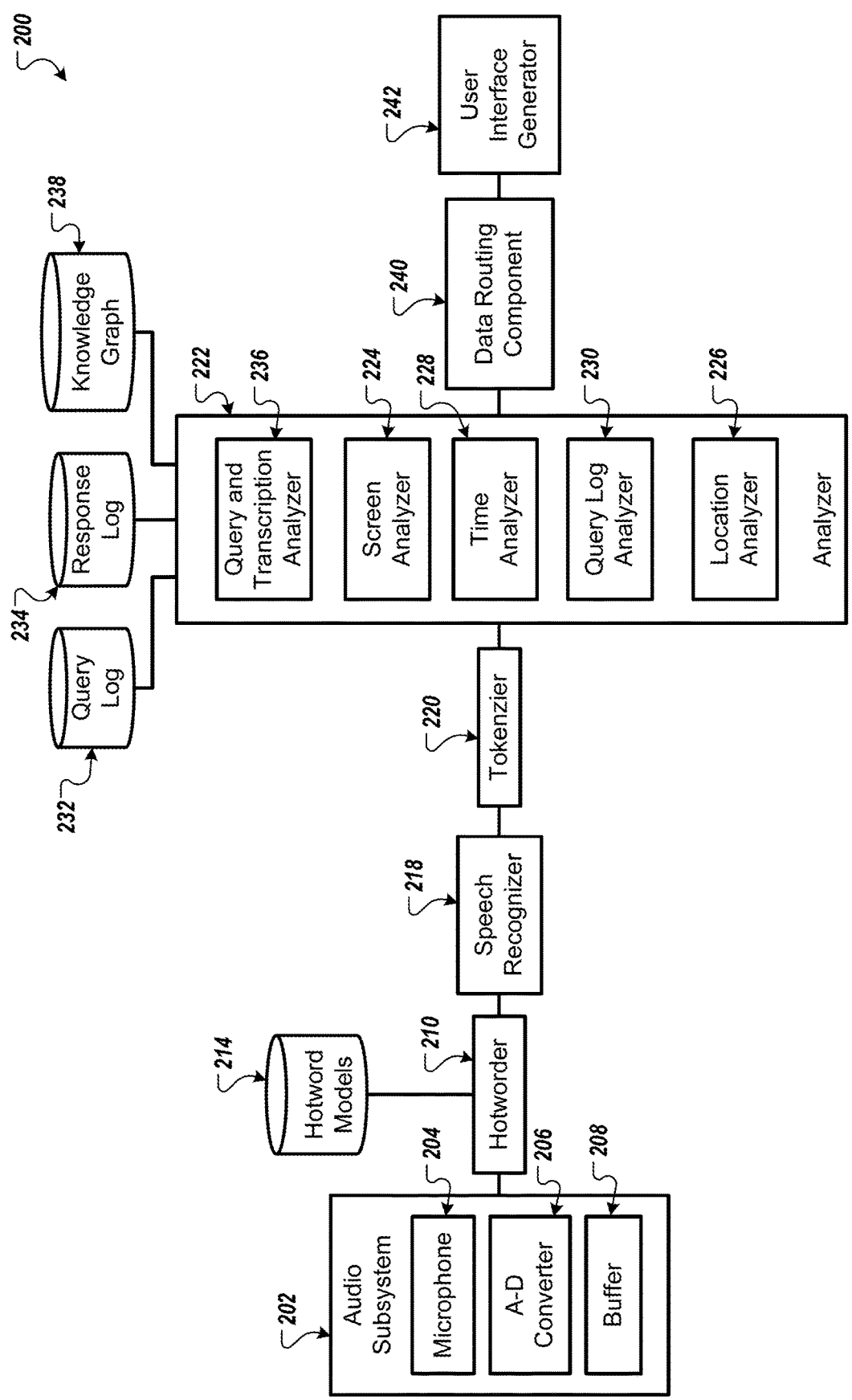
FIG. 2 illustrates example components of a system that determines whether a user is addressing a computing device.

FIG. 2 illustrates example components of a system 200 that determines whether a user is addressing a computing device. The system 200 may be any type of computing device that is configured to receive and process speech audio. For example, the system 200 may be similar to computing device 106 of FIG. 1 or any combination of computing device 106, search engine 118, and speech recognition engine 114 of FIG. 1. The components of system 200 may be implemented in a single computing device, multiple co-located devices, a remote server, or distributed over multiple computing devices that includes local devices and remote systems.

The system 200 includes an audio subsystem 202. The audio subsystem 202 may include a microphone 204, analog to digital converter 206, buffer 208, and various other audio filters. The microphone 204 may be configured to detect sounds in the surrounding area such as speech. The analog to digital converter 206 may be configured to sample the audio data detected by the microphone 204. The buffer 208 may store the sampled audio data for processing by the system 200. In some implementations, the audio subsystem 202 may be continuously active. In this case, the microphone 204 may be constantly detecting sound. The analog to digital converter 206 may be constantly sampling the detected audio data. The buffer 208 may store the latest sampled audio data such as the last ten seconds of sound. If other components of the system 200 do not process the audio data in the buffer 208, then the buffer 208 may overwrite the previous audio data.

The audio subsystem 202 provides audio data to the hotworder 210. The hotworder 210 is configured to identify hotwords in audio received through the microphone 204 and/or stored in the buffer 208. The hotworder 210 may be referred to as a hotword detector, keyword spotter, or keyword detector. In some implementations, the hotworder 210 may be active at any time that the system 200 is powered on. The hotworder 210 continuously analyzes the audio data stored in the buffer 208. The hotworder 210 computes a hotword confidence score that reflects the likelihood that current audio data in the buffer 208 includes a hotword. To compute the hotword confidence score, the hotworder 210 may use the hotword models 214. The hotword models 214 may include different hotword models for different hotwords such as "ok computer," "hey computer," "ok assistant," or other terms and phrases. The hotword models 214 may be adapted for a particular user or be for any user. The hotworder 210 may extract audio features from the audio data 212 such as filterbank energies or mel-frequency cepstral coefficients. The hotworder 210 may use classifying windows to process these audio features such as by using a support vector machine or a neural network. In some implementations, the hotworder 210 does not perform speech recognition to determine a hotword confidence score. The hotworder 210 determines that the audio includes a hotword if the hotword confidence score satisfies a hotword confidence score threshold. For example, the hotworder 210 determines that the audio includes the hotword if the hotword confidence score is 0.8 and the hotword confidence score threshold is 0.7.

In some implementations, the hotworder 210 determines the audio data includes the hotword "ok computer." The hotworder 210 may identify the portion of the audio data 212 that includes the hotword. For example, the hotworder 210 may identify for the speech recognizer 218 the portion of the audio data that includes the hotword "ok computer." The hotworder 210 may provide to the speech recognizer 218 timing data that indicates that the audio data between 0.0 and 0.5 seconds includes the hotword. Alternatively or additionally, the hotworder 210 may provide to the speech recognizer 218 memory location information that indicates that the audio data stored between memory addresses 0x98b89d24 and 0x98b8e35a includes the hotword.

The speech recognizer 218 performs speech recognition on the audio data or on the portion of the audio data 212 that does not include the hotword. The speech recognizer 218 may use a language model and an acoustic model to generate a transcription of the audio data or the portion of the audio data that does not include the hotword. In some implementations, the speech recognizer may not use individual language and acoustic models. Instead, the speech recognizer 218 may use a speech recognition model that is configured to receive audio data and output a transcription. The speech recognition model may use neural networks and/or models trained using machine learning techniques.

The speech recognizer 218 provides the transcription to a tokenizer 220. The tokenizer 220 is configured to tokenize the transcription into the terms that make up the transcription. For example, if the transcription is "how will be the weather in the afternoon," then the tokens identified by the tokenizer 220 may be "how," "will," "be," "the," "weather," "in," "the," and "afternoon." In some implementations a token may include more than one word. For example, "Barack Obama" may be one token.

The tokenizer 220 provides the tokens of the transcription and/or the transcription to the analyzer 222. The analyzer 222 is configured to determine whether the user who spoke the utterance of the transcription was addressing the system 200. The analyzer 222 may generate a confidence score that indicates a likelihood that the user was addressing the system when speaking the utterance. The analyzer 222 may compare the confidence score to a confidence score threshold. If the confidence score satisfies the confidence score threshold, then the analyzer 222 determines that the user was likely addressing the system 200. If the confidence score does not satisfy the confidence score threshold, then the analyzer 222 determines that the user was likely not addressing the system 200. For example, if the confidence score is 0.8 and the confidence score threshold is 0.7, then the analyzer determines that the user was likely addressing the system 200.

The analyzer 222 may include a query and transcription analyzer 236. The query and transcription analyzer 236 may analyze the transcription of the recently received utterance to determine the confidence score. In some implementations, the query and transcription analyzer 236 also uses the transcriptions of one or more previous utterances and/or one or more previous responses from the same user session of the recently received utterance. The system 200 may store transcriptions of the previous utterances in the query log 232 and the previous responses in the response log 234. The query log 232 may include and label the queries from the current user session. Similarly, the response log 234 may include and label the responses provided by the system 200 during the current user session. In some implementations, the query log 232 and the response log 234 may have timestamps to indicate when the system received each query and provided each response. The query log 232 and the response log 234 may also include data to indicate which response was for which query.

The system 200 may define a user session in several different ways. In one instance, the system 200 may define a user session between period during which the system 200 is locked or in a type of low power mode. For example, if system 200 is a mobile phone, a user session may begin when the user unlocked or wakes up the mobile phone and end when the user locks the mobile phone, the mobile phone locks itself after a period of inactivity, and/or the mobile phone enters a low power mode. In another instance, the system 200 may define a user session based on the foreground application being executed by the system 200. When the application changes, the system 200 may indicate that a new user session has begun. For example, the system 200 may be a tablet computer and may be running a messaging application in the foreground. The user may switch to the home screen or to a browser application at which point the system 200 begins a new user session. In another instance, the system 200 may define a user session based on a period of time. In the context of user interaction, the system may 200 begin a new user session if the time period after the system 200 outputs a response to a voice or typed query exceeds a threshold period before the system 200 receives a new voice or typed query. For example, the threshold period may be five seconds. If the system 200 responds to a query and six seconds elapse before the system 200 receives a new voice or typed query, then the system 200 will identify the new voice or typed query as part of a new user session.

The query and transcription analyzer 236 may be configured to compare the terms of the recently received utterance to the terms of the previous utterances and/or the terms of the previous responses from the same user session. The query and transcription analyzer 236 may assign a higher confidence score in instances where there is are common terms between the received utterance and the previous utterance and previous responses. The query and transcription analyzer 236 may assign a higher confidence score in instances where there are more common terms between the received utterance and the previous utterance and previous responses. In some implementations, the query and transcription analyzer 236 may increase the confidence score in instances where the common terms are not common such as "the," "a," "an," "is," "are," or any other similar terms that are common in a general corpus. Instead, the query and transcription analyzer 236 may increase the confidence score in instances where the common terms are terms such as "Barack Obama," "turn," "lights," "traffic," and any other term that are less common in a general corpus.

The query and transcription analyzer 236 may be configured to access the knowledge graph 238 to compare terms of the recently received utterance to the terms of the previous utterances and/or the terms of the previous responses from the same user session. The knowledge graph 238 is a collection of data representing entities and relationships between entities. The data is logically described as a graph, in which each distinct entity is represented by a respective node and each relationship between a pair of entities is represented by an edge between the nodes. Each edge is associated with a relationship and the existence of the edge represents that the associated relationship exists between the nodes connected by the edge. For example, if a node A represents a person alpha, a node B represents a person beta, and an edge E is associated with the relationship "is the father of," then having the edge E connect the nodes in the direction from node A to node B in the graph represents the fact that alpha is the father of beta.

A knowledge graph 238 can be represented by any of a variety of convenient physical data structures. For example, a knowledge graph 238 can be represented by triples that each represent two entities in order and a relationship from the first to the second entity; for example, [alpha, beta, is the father of], or [alpha, is the father of, beta], are alternative ways of representing the same fact. Each entity and each relationship can be and generally will be included in multiple triples.

Alternatively, each entity can be stored as a node once, as a record or an object, for example, and linked through a linked list data structure to all the relationships the entity has and all the other entities to which the entity is related. More specifically, a knowledge graph 238 can be stored as an adjacency list in which the adjacency information includes relationship information.

It is generally advantageous to represent each distinct entity and each distinct relationship with a unique identifier.

The entities represented by a knowledge graph 238 need not be tangible things or specific people. The entities can include particular people, places, things, artistic works, concepts, events, or other types of entities. Thus, a knowledge graph 238 can include data defining relationships between people, e.g., co-stars in a movie; data defining relationships between people and things, e.g., a particular singer recorded a particular song; data defining relationships between places and things, e.g., a particular type of wine comes from a particular geographic location; data defining relationships between people and places, e.g., a particular person was born in a particular city; and other kinds of relationships between entities.

In some implementations, each node has a type based on the kind of entity the node represents; and the types can each have a schema specifying the kinds of data that can be maintained about entities represented by nodes of the type and how the data should be stored. So, for example, a node of a type for representing a person could have a schema defining fields for information such as birth date, birth place, and so on. Such information can be represented by fields in a type-specific data structure, or by triples that look like node-relationship-node triples, e.g., [person identifier, was born on, date], or in any other convenient predefined way. Alternatively, some or all of the information specified by a type schema can be represented by links to nodes in the knowledge graph; for example, [one person identifier, child of, another person identifier], where the other person identifier is a node in the graph.

By accessing the knowledge graph 238, the query and transcription analyzer 236 compares terms that may not be the same but have a relationship in the knowledge graph. The query and transcription analyzer 236 may assign a higher confidence score when the terms of the recently received utterance and the terms of the previous utterances and/or the terms of the previous responses from the same user session have a closer relationship. For example, a node for "Barack Obama" may be connected to a node of "Michelle Obama" by an "is the spouse of" edge. With the nodes of Barack Obama and Michelle Obama connected by one degree, the may assign a higher confidence score than terms that have nodes connected by two degrees, such that there is an intervening node between the two terms of the nodes.

The query and transcription analyzer 236 may adjust the confidence score based on particular types of terms being in the recently received utterance. For example, the query and transcription analyzer 236 may increase the confidence score if one of the terms in the recently received utterance is a pronoun. A pronoun may indicate that the speaker was referring to a term in a previous utterance and/or previous response. In some implementations, the query and transcription analyzer 236 may compare a gender of a pronoun in the recently receive utterance to the terms in the previous utterances and/or previous responses from the user session. If the gender of a pronoun matches a noun in the previous utterances and/or previous responses, then the query and transcription analyzer 236 may increase the confidence score. If the gender of a pronoun does not match a noun in the previous utterances and/or previous responses, then the query and transcription analyzer 236 may decrease the confidence score.

The query and transcription analyzer 236 may adjust the confidence score based on a comparison between the pattern or sentence structure of the recently received utterance and the pattern or sentence structure of the previous utterances and/or the previous responses from the user session. The query and transcription analyzer 236 may increase the confidence score if the pattern or sentence structure of the recently received utterance is the same as the pattern or sentence structure of the previous utterances and/or the previous responses from the user session. The query and transcription analyzer 236 may decrease the confidence score if the pattern or sentence structure of the recently received utterance is not the same as the pattern or sentence structure of the previous utterances and/or the previous responses from the user session. For example, if the previous query is "how tall is Barack Obama" and the current query is "how tall is Taylor Swift," the query and transcription analyzer 236 may determine that both have the structure "how tall is <person>" and may increase the confidence score. If instead the current query is "what is the height of Taylor Swift," the query and transcription analyzer 236 may be able to determine that the questions are both related to the height of a person and increase the confidence score. If the current query is "how old is Taylor Swift," the query and transcription analyzer 236 may determine that the questions do not have the same structure and decrease the confidence score.

The analyzer 222 may include a screen analyzer 224 that identifies the content of the screen of the system 200 during the time period between the previous utterance and/or previous response and the current query. For example, if the previous query is "what is my day," and, after which, the content of the screen of the system 200 is the weather for the morning. With the weather for the morning on the screen of the system 200, the system 200 receives the utterance "how will the weather be in the afternoon." The screen analyzer 224 may increase the confidence score based on the presence of weather data on the screen of the system 200 when the speaker asks about the weather. If instead the current utterance is "where was Barack Obama born," the screen analyzer 224 would decrease the confidence score when the weather for the morning is on the screen because where Barack Obama was born is not related to the weather for the morning.

The analyzer 222 may include a location analyzer 226 that determines whether the current query is likely directed toward the system 200 based on the location of the system. If the current query is related to the location of the system 200, then the location analyzer 226 may increase the confidence score. The current query may be related to the location of the device if the current query references a place, landmark, building, business, and/or location that is within a threshold distance of the location of the device. If the current query is unrelated to the location of the system 200, then the location analyzer 226 may decrease the confidence score. For example, the previous query may be "what is the weather" and the current query may be "how tall is the Eiffel Tower." The location of the system 200 may be Paris. Based on a question being related to Paris and the system 200 being located in Paris, the location analyzer 226 may increase the confidence score. If the current query is "how high is Mount Everest," then the location analyzer 226 may determine that Mount Everest is not related to Paris and decrease the confidence score.

The analyzer 222 may include a time analyzer 228 that determines whether the current query is likely directed toward the system 200 based on the time that the system 200 received the current query. If the current query is relevant to the current time, then the time analyzer 228 may increase the confidence score. If the current query is not relevant to the current time, then the time analyzer 228 may decrease the confidence score. The current query may be relevant to the current time if an action that corresponds to the current query is typically received by the system at or near the current time. The time analyzer 228 may compare the current query to the queries and corresponding timestamps in the query log 232 to determine whether the current query is typically received by the system at or near the current time. For example, the previous query may be "what is the weather" and the current query may be "turn on the lights" received at 7:00 am in the morning. Based on a query to turn on the lights being received at 7:00 am, the time analyzer 228 may increase the confidence score. In some implementations, the time analyzer 228 may consider the number of previous queries received before the current query for the current day. For example, the time analyzer 228 may increase the confidence score based on "turn on the lights" being the speaker's second query for the current day. If the speaker has provided more queries, such as fifteen queries during the current day before speaking "turn on the lights," then the time analyzer 228 may decrease the confidence score. Similarly, in the evening hours, queries such as "turn off the lights" and "set an alarm for 7 am" may cause the time analyzer 228 to increase the confidence score.

In some implementations, the time analyzer 228 may assist in identifying when the user session has ended. The time analyzer 228 may determine an elapsed time since the receipt of a query or the output of a response to a query. In some instances, the time analyzer 228 may decrease the confidence score as more time elapses since the receipt of a query or the output of a response to a query. If the elapsed time reaches a certain amount of time (e.g., ten seconds), then the time analyzer 228 may indicate that the user session has ended. In this instance, the user may have to touch the system or speak a hotword to initiate a new user session.

The analyzer 222 may include a query log analyzer 230 that that determines whether the current query is likely directed toward the system 200 based on the speaker's previous interactions with the system 200. If a user speaks the same query around the same time each day, then query log analyzer 230 may increase the confidence score of a current query that matches that same query. In other words, the system 200 may identify a pattern in prior queries, or commonality in time, structure, and/or content, and determine that the current query matches the identified pattern. The query log analyzer 230 may access the query log 232 to compare the current query to the speaker's previous queries. For example, the user may speak "ok computer, tell me about my day." The system 200 generates a response to the "tell me about my day" query. The user continues by speaking "what is the traffic to work today?" The query log analyzer 230 may compare the "what is the traffic to work today" query to the query log 232 and determine that the user has spoken the same query in the morning each of the past five workdays. Based on that frequency of the "what is the traffic to work today" query, the query log analyzer 230 increases the confidence score. In some implementations, the current query may be similar, but not identical to past queries received at approximately the same on previous days. In this case, the query and transcription analyzer 236 may identify the similarity. Based on that similarity, the query log analyzer 230 increases the confidence score.

The analyzer 222 may use any combination of the query and transcription analyzer 236, the screen analyzer 224, the time analyzer 228, the query log analyzer 230, and the location analyzer 226 to generate a confidence score that reflects the likelihood that speaker was addressing the system 200 when speaking the current query. The analyzer 222 may compare the confidence score to a confidence score threshold to determine whether the current query was likely intended for the system 200.

Based on the determination related to whether the current query was likely intended for the system 200, the system 200 configures the data routing component 240. In instances where the analyzer 222 determines that the query was likely not intended for the system, the system 200 configures the data routing component 240 to take no action on the query. For example, if the system 200 receives the query "how tall is Taylor Swift," and the analyzer 222 determines that the query is likely not intended for the system 200, then the system 200 configures the data routing component 240 to take no action on the query. If the system receives the query "who is Michelle Obama," and the analyzer 222 determines that the query is likely intended for the system 200, then the system 200 configures the data routing component 240 route the query to the appropriate part of the system 200 or other device. The system 200 may analyze the query to determine the appropriate destination for the query. Some destinations may include a search engine, a messaging application, a phone application, or any other similar device, component, or application. The system 200 may configure the data routing component 240 to route the transcription of the query to the identified destination. For example, the system 200 may configure the data routing component 240 to route the query "how old is Michelle Obama" to a search engine.

The system 200 may configure the data routing component 240 to route the query "text mom I'll be home soon" to a contacts application and a messaging application. The system 200 may configure the data routing component 240 to route the "mom" portion to the contacts application and the "I'll be home soon" portion to a messaging application.

In some implementations, the system 200 may display an indication of the processing of the current query on the screen of the system 200. The user interface generator 242 may generate content for display on the screen. In instances where the analyzer 222 determines that the query is likely not intended for the system 200, the user interface generator 242 may not provide any content to the display on the screen related to the query. In this instance, the user will see that the system 200 is not processing the query because the screen provided no indication of such. In instances where the analyzer 222 determines that the query is likely intended for the system 200, the user interface generator 242 provides content related to the response from the component or application that received the query from the data routing component 240. For example, the user interface generator 242 may generate content of the search results received from the search engine in response to the query "how old is Michelle Obama." In another example, the user interface generator 242 may generate content of the messaging application with the message "I'll be home soon" ready to send to the contact mom.

Figure 3:
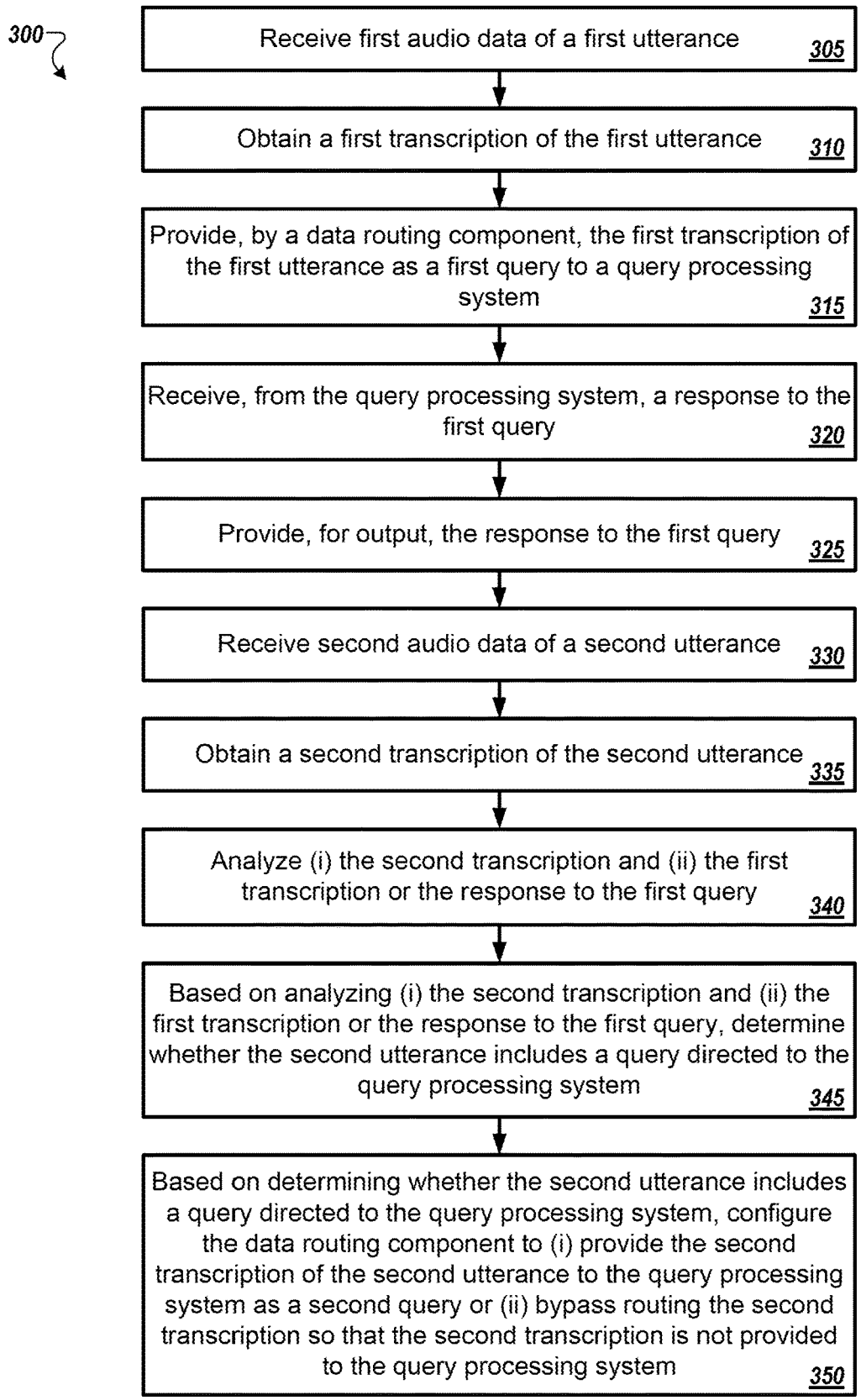
FIG. 3 is a flowchart of an example process for determining whether a user is addressing a computing device.

FIG. 3 is a flowchart of an example process 300 for determining whether a user is addressing a computing device. In general, the process 300 analyzes a transcription of a user utterance and the context of the system that receives the utterance. The context can include a previous user utterance and corresponding system response, the contents of a user-facing display, the location of the system, the current time, or a log of previous queries provided by the user. The process 300 analyzes the transcription of the user utterance and the context of the system to determine whether the user is addressing the system. The process 300 will be described as being performed by a computer system comprising one or more computers, for example, the computing device 106 of FIG. 1 or system 200 of FIG. 2.

The system receives first audio data of a first utterance (305). In some implementations, the first audio data includes a hotword as a signal from the user that the user is addressing the system. For example, the user may say "ok computer, where was Barack Obama born," and the system receives the utterance through a microphone. The system may identify the hotword "ok computer," and process the remaining portion of the query because the system determines that the user intended the utterance for the system based on including the hotword.

The system obtains a first transcription of the first utterance (310). In some implementations, the system provides the audio data of the first utterance to a speech recognition engine. For example, the system may provide the audio data of the utterance "where was Barack Obama born" to a speech recognition engine and receive a transcription of the audio data.

In some implementations, the system provides, by a data routing component, the first transcription of the first utterance as a first query to a query processing system (315). Because the user included a hotword in the utterance, the system determines that the utterance is intended for the system. The system configures a data routing component to route the transcription to the appropriate application, component, or device, depending on the transcription of the first query. The system may configure the data routing component to route the transcription to a query processing system that may be a search engine, a messaging application, a phone application, or any other type of component, application, or device. The system may select the appropriate query processing system based on the transcription.

In some implementations, the system receives, from the query processing system, a response to the first query (320). For example, if the query processing system is a search engine, then the system may receive a search result to the transcription provided to the search engine. If the query processing system is a messaging application, then system may receive a response that the message included in the transcription is ready to send to the recipient indicated in the transcription.

In some implementations, the system provides, for output, the response to the first query (325). For example, the system may output, using a speech synthesizer, the search result. In another example, the system may output on a display of the system, the transcription in a messaging application and ready to send to the recipient.

The system receives second audio data of a second utterance (330). In some implementations, the system receives the second audio through a microphone of the system. The system may determine that the second audio does not include an indication that the user intended the second utterance for the system. For example, the second utterance may not include a hotword and may be the utterance "how old is Michelle Obama." In some implementations, the system receives the second utterance during the same user session that the system received the first utterance.

The system obtains a second transcription of the second utterance (335). In some implementations, the system provides the audio data of the second utterance to a speech recognition engine. For example, the system may provide the audio data of the utterance "how old is Michelle Obama" to a speech recognition engine and receive a transcription of the audio data.

The system analyzes (i) the second transcription and (ii) the first transcription or the response to the first query (340). In some implementations, the system analyzes only the second transcription. In some implementations, the system analyzes only the second transcription and the first transcription. In some implementations, the system analyzes only the second transcription and the response to the first query. In some implementations, the system analyzes the second transcription, the first transcription, and the response to the first query.

In some implementations, the system analysis includes tokenizing (i) the second transcription and (ii) the first transcription and/or the response to the first query. The system compares the tokens of the second transcription to the tokens of the first transcription and/or the response to the first query. The tokens include the terms of the transcriptions and queries.

In some implementations, the system determines a relationship between the tokens of (i) the second transcription and (ii) the tokens of the first transcription and/or the response to the first query. The system may access a knowledge graph to determine the relationship between the tokens. For example, the system may determine that a node in the knowledge graph that corresponds to "Barack Obama" is separated by one edge from a node that corresponds to "Michelle Obama."

In some implementations, the system analysis includes identifying the types of terms in the tokens of (i) the second transcription and, optionally, (ii) the tokens of the first transcription and/or the response to the first query. The system may identify the parts of speech of each of the terms. For example, the system may determine that the second transcription of "how tall is he" includes the pronoun "he."

In some implementations, the system analysis includes comparing the grammatical structure of (i) the second transcription and (ii) the first transcription and/or the response to the first query. For example, the system may determine that the second transcription and the first transcription have the sentence structure of "how old is <person>" or both the second transcription and the first transcription are related to determining the age of a person.

In some implementations, the system analysis includes comparing the grammatical structure of the second transcription to a query log that includes previous queries that the user spoke to the system. The query log may include not only the previous query, but also queries from previous days and weeks. The query log may include a timestamp for each query that indicates when the system received the query from the user. The system may determine that the second transcription matches the structure of a query that the user spoke each morning during the past five workdays.

The system, based on analyzing (i) the second transcription and (ii) the first transcription or the response to the first query, determines whether the second utterance includes a query directed to the query processing system (345). In some implementations, the system generates a confidence score that reflects a likelihood that the second utterance includes a query directed to the system or the query processing system. The system may compare the confidence score to a confidence score threshold to determine whether the second utterance was likely directed to the system or the query processing system.

In some implementations, the system may generate the confidence score based on one or more of the types of analysis performed on (i) the second transcription and, optionally, (ii) the first transcription and/or the response to the first query. A higher confidence score may indicate a higher likelihood that the user intended the second utterance for the system. For example, the system may increase the confidence score if there are common terms in (i) the second transcription and (ii) the second transcription and/or the response to the first query. The system may decrease the confidence score if there are no common terms in (i) the second transcription and (ii) the second transcription and/or the response to the first query. The system may increase the confidence score if the sentence structure of the second transcription matches the structure of the second transcription and/or the response to the first query. The system may decrease the confidence score if the sentence structure of the second transcription does not match the structure of the second transcription and/or the response to the first query. The system may increase the confidence score if the second transcription includes a pronoun and may decrease the confidence score if the second transcription does not include a pronoun. The system may increase the confidence score if the second transcription matches queries in the query log and may decrease the confidence score if the second transcription does not match queries in the query log.

The system may consider additional factors when generating the confidence score. In some implementations, the system may determine the content of a user-facing display at or about the time that the system received the audio data of the second utterance. If the second utterance is related to the content of the user-facing display, then the system may increase the confidence score. If the second utterance is not related to the content of the user-facing display, then the system may decrease the confidence score.

In some implementations, the system may determine the location of the device that received the second utterance. If the second utterance is related to the location of the device that received the second utterance, then the system may increase the confidence score. If the second utterance is not related to the location of the device that received the second utterance, then the system may decrease the confidence score.

In some implementations, the system may determine the time that the system received the second utterance. If the second utterance is related to the time that the system received the second utterance, then the system may increase the confidence score. If the second utterance is not related to the time that the system received the second utterance, then the system may decrease the confidence score.

The system, based on determining whether the second utterance includes a query directed to the query processing system, configures the data routing component to (i) provide the second transcription of the second utterance to the query processing system as a second query or (ii) bypass routing the second transcription so that the second transcription is not provided to the query processing system (350). In instances where the system configures the data routing component to provide the second transcription of the second utterance to the query processing system as a second query, the system may configure the data routing component to provide the second utterance to an external device or system, an application running on the system, or any other device, application, or component. In instances where the system configures the data routing component to bypass routing the second transcription, the system may appear to perform no action on the second transcription. For example, a screen of the system may be blank.

Figure 4:
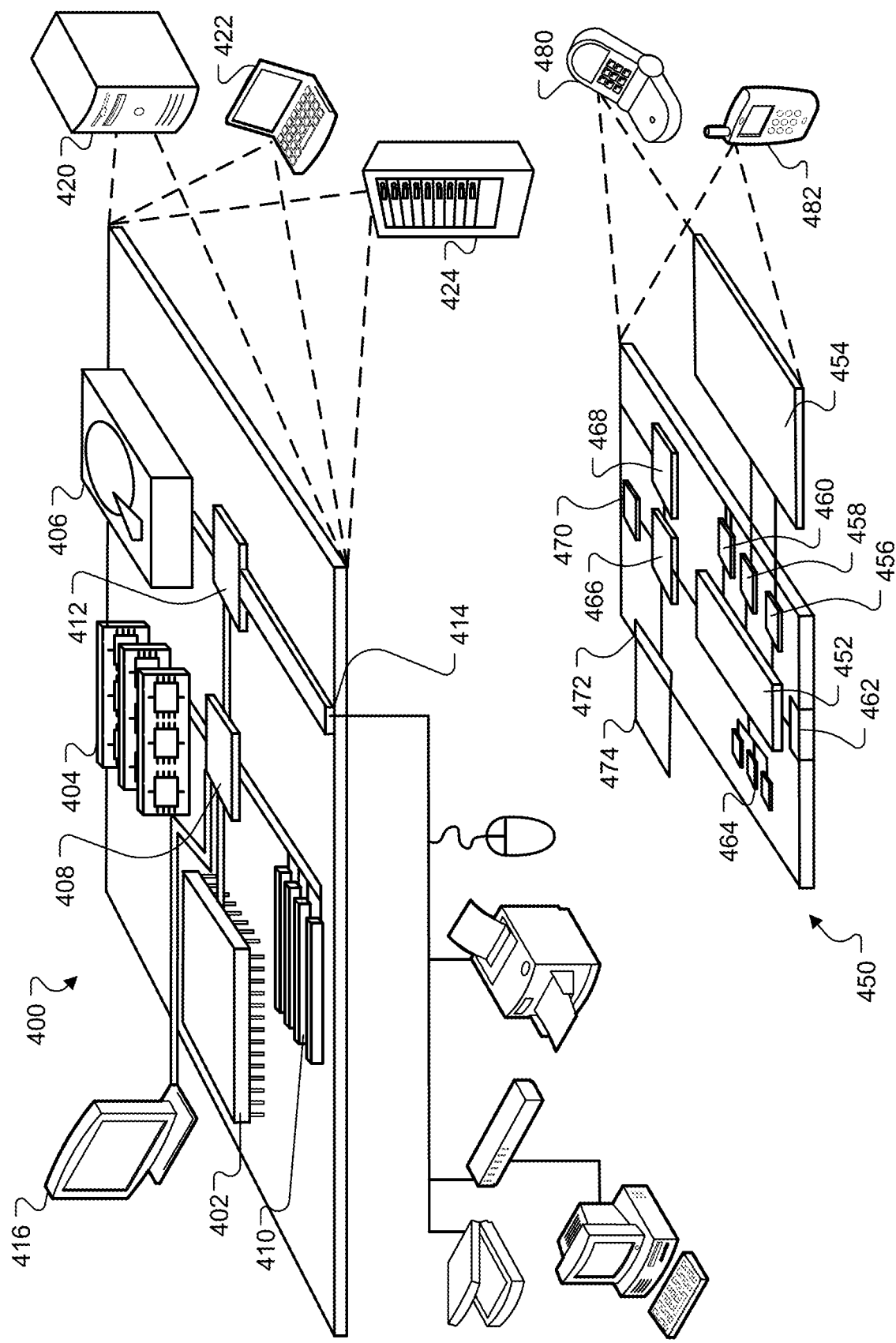
FIG. 4 is an example of a computing device and a mobile computing device.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet. In some implementations, the systems and techniques described here can be implemented on an embedded system where speech recognition and other processing is performed directly on the device.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

The invention claimed is:

1. A computer-implemented method comprising:
   receiving, by a computing device, first audio data of a first utterance;
   obtaining, by the computing device, a first transcription of the first utterance;
   receiving, by the computing device, second audio data of a second utterance;
   obtaining, by the computing device, a second transcription of the second utterance;
   determining, by the computing device, whether the second utterance includes a query directed to a query processing system based on analysis of (i) the second transcription and (ii) the first transcription or a response to the first utterance, wherein determining whether the second utterance includes a query directed to the query processing system comprises:
   tokenizing the second transcription,
   determining whether a pronoun, in the second transcription, refers to a noun in the first transcription or in the response to the first utterance, and
   determining whether the second utterance includes a query directed to the query processing system based on whether the pronoun, in the second transcription, refers to the noun in the first transcription or in the response to the first utterance; and
   based on determining whether the second utterance includes a query directed to the query processing system, configuring, by the computing device, a data routing component to (i) provide the second transcription of the second utterance to the query processing system as a second query or (ii) bypass routing the second transcription so that the second transcription is not provided to the query processing system.

2. The method of claim 1, wherein determining whether the second utterance includes a query directed to the query processing system is based on analysis of (i) the second transcription and (ii) the first transcription.

3. The method of claim 1, wherein determining whether the second utterance includes a query directed to the query processing system is based on analysis of (i) the second transcription and (ii) the response to the first utterance.

4. The method of claim 1, wherein determining whether the second utterance includes a query directed to the query processing system is based on analysis of the second transcription, the first transcription, and the response to the first utterance.

5. The method of claim 1, wherein:
determining whether the second utterance includes a query directed to the query processing system comprises determining that the second utterance includes a query directed to the query processing system, and
configuring the data routing component to provide the second transcription of the second utterance to the query processing system as the second query.

6. The method of claim 1, wherein:
determining whether the second utterance includes a query directed to the query processing system comprises determining that the second utterance does not include a query directed to the query processing system, and
configuring the data routing component to bypass routing the second transcription so that the second transcription is not provided to the query processing system.

7. The method of claim 1, wherein:
determining whether the second utterance includes a query directed to the query processing system comprises:
tokenizing (i) the second transcription and (ii) the first transcription or the response to the first utterance; and
comparing (i) terms of the second transcription and (ii) terms of the first transcription or the response to the first utterance.

8. The method of claim 7, wherein comparing (i) the terms of the second transcription and (ii) the terms of the first transcription or the response to the first utterance comprises determining a relationship between (i) the terms of the second transcription and (ii) the terms of the first transcription or the response to the first utterance in a knowledge graph.

9. The method of claim 1, wherein:
determining whether the second utterance includes a query directed to the query processing system is based on comparing (i) a grammatical structure of the second transcription and (ii) a grammatical structure of the first transcription or the response to the first utterance.

10. The method of claim 1, comprising:
determining content on a user interface; and
determining whether the second utterance includes a query directed to the query processing system based on the content of the user interface.

11. The method of claim 1, comprising:
determining a location of a user device that detected the first utterance and the second utterance through a microphone; and
determining whether the second utterance includes a query directed to the query processing system based on the location of the user device that detected the first utterance and the second utterance through the microphone.

12. The method of claim 1, comprising:
determining a time that the computing device receives the second audio data of the second utterance; and
determining whether the second utterance includes a query directed to the query processing system based on the time that the computing device receives the second audio data of the second utterance.

13. The method of claim 1, wherein:
analyzing (i) the second transcription and (ii) the first transcription or the response to the first utterance comprises comparing the second transcription with one or more queries in a query log, and
determining whether the second utterance includes a query directed to the query processing system is based on comparing the second transcription with the one or more queries in the query log.

14. The method of claim 1, comprising:
providing, by the data routing component of the computing device, the first transcription of the first utterance as a first query to the query processing system;
receiving, from the query processing system, a response to the first query; and
providing, for output by the computing device, the response to the first query.

15. A system comprising:
one or more computers; and
one or more storage devices storing instructions that are operable, when executed by the one or more computers, to cause the one or more computers to perform the operations comprising:
receiving, by a computing device, first audio data of a first utterance;
obtaining, by the computing device, a first transcription of the first utterance;
receiving, by the computing device, second audio data of a second utterance;
obtaining, by the computing device, a second transcription of the second utterance;
determining, by the computing device, whether the second utterance includes a query directed to a query processing system based on analysis of (i) the second transcription and (ii) the first transcription or a response to the first utterance, wherein determining whether the second utterance includes a query directed to the query processing system comprises tokenizing the second transcription,
determining whether a pronoun, in the second transcription, refers to a noun in the first transcription or in the response to the first utterance, and
determining whether the second utterance includes a query directed to the query processing system based on whether the pronoun, in the second transcription, refers to the noun in the first transcription or in the response to the first utterance; and
based on determining whether the second utterance includes a query directed to the query processing system, configuring, by the computing device, a data routing component to (i) provide the second transcription of the second utterance to the query processing system as a second query or (ii) bypass routing the second transcription so that the second transcription is not provided to the query processing system.

16. The system of claim 15, wherein determining whether the second utterance includes a query directed to a query processing system is based on analysis of the second transcription, the first transcription, and the response to the first utterance.

17. The system of claim 15, wherein:
   determining whether the second utterance includes a query directed to the query processing system comprises determining that the second utterance does not include a query directed to the query processing system, and
   configuring the data routing component to bypass routing the second transcription so that the second transcription is not provided to the query processing system.

18. The system of claim 15, wherein:
   determining whether the second utterance includes a query directed to the query processing system comprises:
      tokenizing (i) the second transcription and (ii) the first transcription or the response to the first utterance; and
      comparing (i) terms of the second transcription and (ii) terms of the first transcription or the response to the first utterance.

19. A non-transitory computer-readable medium storing software comprising instructions executable by one or more computers which, upon such execution, cause the one or more computers to perform the operations comprising:
   receiving, by a computing device, first audio data of a first utterance;
   obtaining, by the computing device, a first transcription of the first utterance;
   receiving, by the computing device, second audio data of a second utterance;
   obtaining, by the computing device, a second transcription of the second utterance;
   determining, by the computing device, whether the second utterance includes a query directed to a query processing system based on analysis of (i) the second transcription and (ii) the first transcription or a response to the first utterance, wherein determining whether the second utterance includes a query directed to the query processing system comprises
   tokenizing the second transcription,
      determining whether a pronoun, in the second transcription, refers to a noun in the first transcription or in the response to the first utterance, and
      determining whether the second utterance includes a query directed to the query processing system based on whether the pronoun, in the second transcription, refers to the noun in the first transcription or in the response to the first utterance; and
   based on determining whether the second utterance includes a query directed to the query processing system, configuring, by the computing device, a data routing component to (i) provide the second transcription of the second utterance to the query processing system as a second query or (ii) bypass routing the second transcription so that the second transcription is not provided to the query processing system.

* * * * *